United States Patent [19]
Gorman

[11] Patent Number: 5,188,374
[45] Date of Patent: Feb. 23, 1993

[54] ONE-PIECE SEAL FOR ROTATING ANNULAR INTERFACE

[75] Inventor: Michael J. Gorman, Royal Oak, Mich.

[73] Assignee: General Motors Corporation, Detroit, Mich.

[21] Appl. No.: 891,073

[22] Filed: Jun. 1, 1992

[51] Int. Cl.⁵ ............................................. F16J 9/06
[52] U.S. Cl. .................................. 277/35; 277/19; 277/42; 277/70; 277/139; 277/142; 277/175; 277/216
[58] Field of Search ..................... 277/16, 17, 18, 19, 277/35, 38, 42, 59, 70, 139, 142, 175, 177, 141, 216

[56] References Cited

U.S. PATENT DOCUMENTS

| | | | |
|---|---|---|---|
| 2,656,230 | 1/1953 | Phillips | 277/139 |
| 2,749,193 | 6/1956 | Traub | 277/188 A |
| 2,983,533 | 5/1961 | Tisch | 288/19 |
| 3,036,846 | 5/1962 | Pecas | 277/59 |
| 3,186,723 | 6/1965 | Wagner | 277/139 |
| 3,333,856 | 8/1967 | Voitik | 277/59 |
| 3,588,125 | 6/1971 | Mastromatteo | 277/59 |
| 3,917,288 | 1/1975 | Huber et al. | 277/59 |
| 4,165,079 | 8/1979 | Clements | 277/9.5 |

Primary Examiner—William A. Cuchlinski, Jr.
Assistant Examiner—Daniel G. DePumpo
Attorney, Agent, or Firm—Patrick M. Griffin

[57] ABSTRACT

A seal for the rotating annular interface between a transmission input shaft and surrounding piston drum is uniquely configured as a single, integral part. A circular trough with two annular side walls is machined into the input shaft. The seal includes two annular side rings sized to contact the inside of the piston drum radially, and to contact the side walls of the trough axially. A bridging section joins the two side rails, and also preloads them into the trough side walls. Therefore, when hydraulic fluid is pumped between the side rails, it is prevented from leaking between the side rings and side walls and into the interface.

2 Claims, 2 Drawing Sheets

ONE-PIECE SEAL FOR ROTATING ANNULAR INTERFACE

This invention relates to seals in general, and specifically to a one-piece seal that can be used to block the annular interface between a pair of mutually rotating, cylindrical components.

BACKGROUND OF THE INVENTION

A difficult sealing challenge is presented when pressurized fluid must travel across the annular interface formed between a pair of coaxial, relatively rotating cylindrical components. An example of such an environment can be found in a typical vehicle automatic transmission. Various hydraulically operated clutches in the system include cylindrical drums that closely surround the outer surface of an input shaft, forming a thin, annular interface. The pressurized hydraulic fluid needed to operate the clutch piston is supplied by an oil pump, and travels down the center of the input shaft until it reaches the point where the clutch drum surrounds the shaft. From there, a cross drilled feed passage takes the fluid through the shaft and to the interface. From there, the pressurized fluid travels through a port in the piston drum, so as to supply the pressure necessary to operate the piston. Obviously, it is important to prevent too much of the pressurized fluid from leaking into the interface if enough pressure is to be left for the piston.

To prevent fluid loss, a pair of circular grooves is cut into the surface of the input shaft bordering the outlet of the pressurized fluid feed passage, each of which holds an annular seal ring. The sides of the seal rings are flat, so as to closely engage the side walls of the grooves, and the free state diameter of the seal ring is close to the diameter of the inner surface of the piston drum, against which it must seal. In addition, the seal ring is often cut at one point, so that the diameter of the ring can expand and contract to accommodate temperature expansion and contraction, or eccentricity between the shaft and drum, thereby maintaining the radial continuity of the seal. The ring may be cut on a diagonal, so as to create two sloped- or wedge-shaped free ends that overlap and slide back and forth over one another, maintaining the circumferential continuity of the seal ring as it expands and contracts. One drawback of this type of seal ring is that it works best only if there is no axial gap between the seal rings and the side walls of the grooves when the pressurized fluid first leaves the feed passage. If contact is not complete, then pressurized fluid can find its way out the gap and into the interface, threatening the axial continuity of the seal. Likewise, in the case where the seal ring has overlapping, slanted ends, part of the seal may tend to get pried away from the side wall of the groove by the underlying sloped end, also threatening the axial continuity of the seal.

SUMMARY OF THE INVENTION

The invention provides a new seal means for the type of environment described which uses a one-piece blocking seal, as opposed to two separate rings.

In the preferred embodiment disclosed, a single trough of predetermined depth is machined into the outer surface of the input shaft, opening into the annular interface between the shaft and piston drum, and aligned with both the shaft feed passage and the piston drum port. The trough has two axially opposed side walls, and is considerably axially wider than a typical seal ring groove would be.

The blocking seal is molded or otherwise formed in one piece from a resilient, flexible sealing material, with a pair of annular side rails that are interconnected by a bridging section. Each side rail has a free state outer diameter basically equal to that of the inner surface of the piston drum, and a radial thickness greater than the interface. Therefore, each ring is capable of making complete contact with the inner surface of the piston drum, and with the side walls of the trough, thereby completely blocking the interface. Each side rail also has a diagonal cut of the type that creates overlapping, sloped ends, to allow the side rail to expand and contract in diameter to maintain complete contact with drum.

The bridging section connects the side rails together, as a single, integral unit, but is discrete in the sense that it does not block all of the axial space between the side rails, and so will still allow cross flow of pressurized fluid. In one embodiment, it is simply a short beam that extends diagonally across the side rails. In another, it is a series of convolutions that touches the side rails in several spots. In both cases, the bridging section is radially thinner than the side rails, and so does not touch the inner surface of the piston drum. More importantly, the bridging section serves to press the side rails slightly apart, preloading them into the trough side walls, and to press the overlapping, slanted rail ends together. Therefore, when pressurized fluid enters the trough, the side rails are already in their sealing, blocking position, tight to the trough walls, a condition that the pressurized fluid will only serve to reinforce and maintain. Furthermore, the mutual wedging action of the sloped side rail ends is resisted. The radial, axial, and circumferential continuity of the seal is improved, all in a seal that is simpler to handle and install.

It is, therefore, a general object of the invention to provide a one-piece seal to be used to block the kind of interface generally found between the input shaft and piston drum of an automotive transmission.

It is another object of the invention to provide such a seal that is uniquely configured to act in cooperation with a single, wider circular trough cut into the input shaft, as opposed to a pair of grooves.

It is another object of the invention to provide such a seal in which the unifying, integrating structure of the seal also serves to preload the seal into an initial, solid sealing condition, so that the pressurized fluid will only be in a position to maintain the blocking seal, not interfere with it.

DESCRIPTION OF THE PREFERRED EMBODIMENT

These and other objects and features of the invention will appear from the following written description, and from the drawings, in which.

Figure 1:
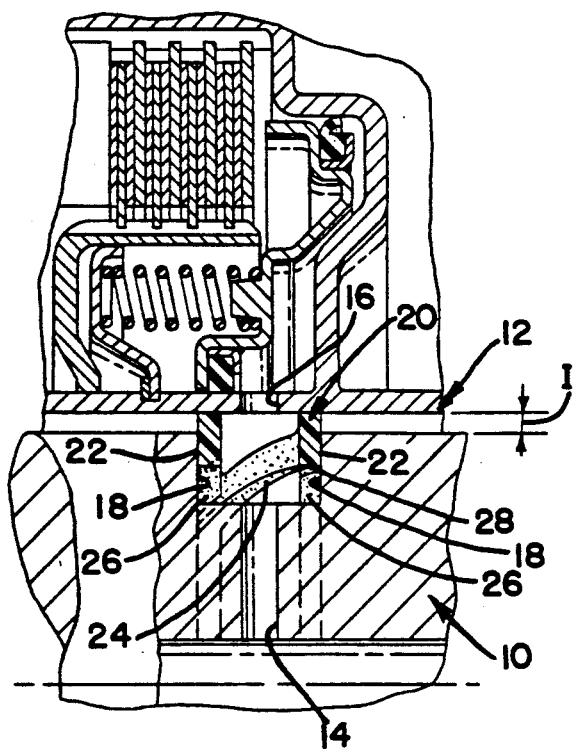
FIG. 1 is a partial cross sectional view of the input shaft and piston drum of a transmission incorporating a first embodiment of the seal means of the invention.

Referring first to FIG. 1, a typical vehicle automatic transmission includes a cylindrical input shaft (10) surrounded closely by the piston drum (12) of a hydraulically operated clutch. Shaft (10) and drum (12) are basically coaxial, but rotate independently, and at different rates. Therefore, the outer surface of shaft (10) and surrounding inner surface of drum (12) cannot actually touch, forming instead a thin annular space or interface of thickness I. Even the thickness I is not necessarily a constant, since there will be some inevitable running eccentricity between shaft (10) and drum (12). Shaft (10) has a cross drilled hydraulic feed passage (14) that opens into the annular interface in alignment with a port (16) through drum (12). Pressurized hydraulic fluid must exit feed passage (14) and get to and through port (16) without excessive leakage between shaft (10) and drum (12). A circular trough is cut into shaft (10), comprised of two axially spaced side walls (18) of predetermined radial depth, square to the axis of shaft (10). The side walls (18) border feed passage (14) and port (16).

Figure 2:
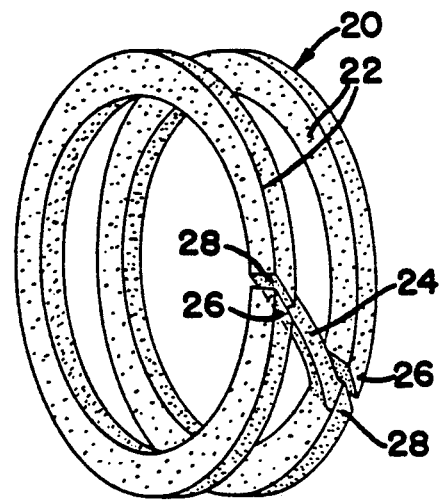
FIG. 2 is a perspective view of the first embodiment of the invention in a free state.
Figure 3:
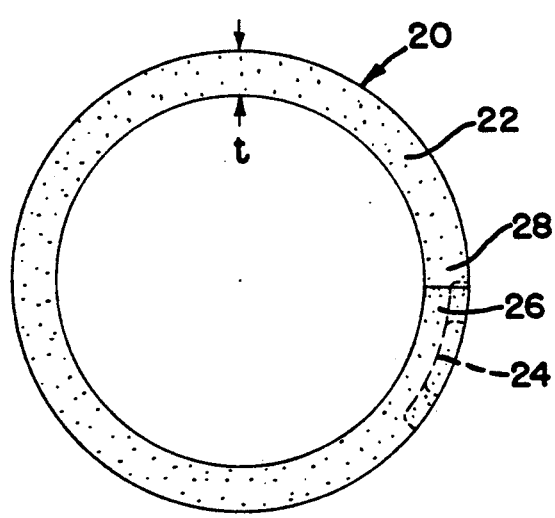
FIG. 3 is an axial view of the seal of FIG. 2.
Figure 4:
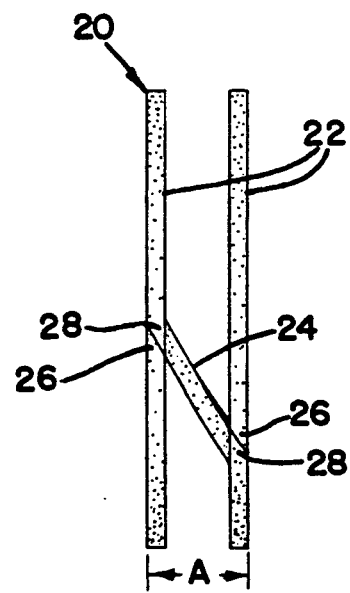
FIG. 4 is a side view of the FIG. 2 seal.
Figure 5:
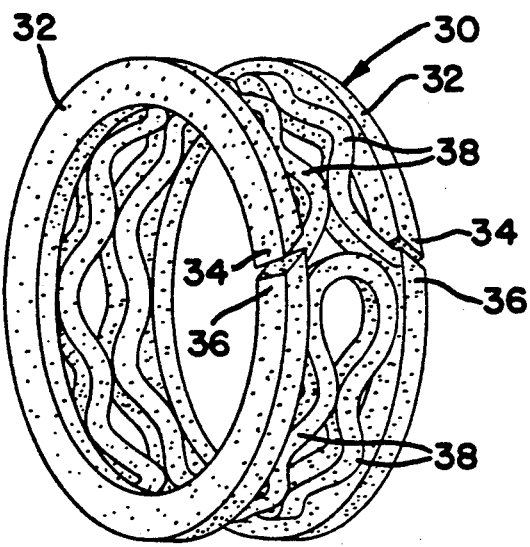
FIG. 5 is a perspective view of a second embodiment in a free state.
Figure 6:
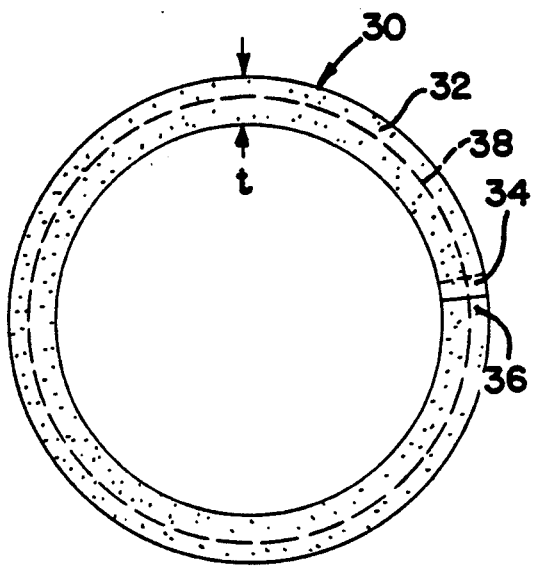
FIG. 6 is an axial view of the FIG. 5 seal.
Figure 7:
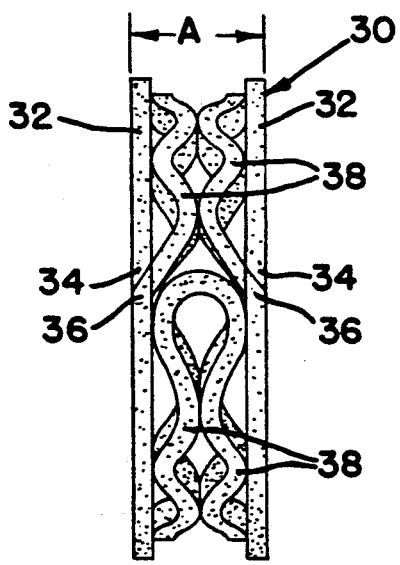
FIG. 7 is a side view of the FIG. 5 seal.

Referring next to FIGS. 2–4, a first embodiment of the blocking seal of the invention, indicated generally at (20), is designed to cooperate with the spaced trough side walls (18). Seal (20) is molded in one piece from a suitably flexible and resilient sealing material, such as nitrile rubber. However, seal (20) could be formed out of another material, even roll formed steel stock, which still has some flexibility and resilience, at least in thin sections. Seal (20) has three basic parts, two identical, axially spaced annular side rails (22), and an interconnecting bridging section (24). Each side rail (22) has a radial thickness t that is significantly greater than I, but somewhat less than the radial depth of the side walls (18). In addition, each side rail (22) is severed at one point on a diagonal, thereby producing two overlapping sloped ends, an underlying end (26) and an overlying end (28), each diagonally opposed to the cut end on the opposite side rail (22). The overlapping ends (26) and (28) can slide back and forth on one another to allow each side rail (22) to independently contract or expand, thereby maintaining close contact with the inner surface of drum (12), so as to compensate either for temperature effects or running eccentricity at the interface, or both.

Referring to FIGS. 1–4, the bridging section (24) cooperates with the side rails (22) to increase their sealing effectiveness. Bridging section (24) is a short beam that extends diagonally between the two overlying sloped ends 28. Therefore, seal (20) is one continuous, integral piece, moving from an end (26) to the other. However, the bridging section is discrete in the sense that it occupies very little of the total space between the side rails (22). The bridging section (24) is also radially thinner than t and, more important, is radially inset from the cylindrical surface that the outer edges of the side rails (22) lie upon. The bridging section (24) is effectively long enough to keep the outer surfaces of the side rails (22) spaced axially apart by an amount indicated at A that is just slightly greater than the degree to which the trough side walls (18) are spaced apart. These dimensions allow seal (20) to be installed and operate in a manner described next.

Referring again to FIG. 1, seal (20) is installed to input shaft (10) before the piston drum (12) is assembled by running it over the shaft (10) until it reaches and seats itself between the trough side walls (18). Then, the piston drum (12) and the rest of the transmission are assembled. Given the free state diameter and radial thickness of seal (20) described above, the outer edge of the side rails (22) makes solid contact with the inner surface of drum (12), blocking the interface, but any excessive diameter differential relative to drum (12) can be relieved by the overlapped ends (26) and (28) sliding past one another, preventing buckling or wrinkling. There is also a slight compression of the bridging section (24). As a consequence, the side rails (22) are preloaded axially outwardly and against the trough side walls (18). When hydraulic fluid leaves the shaft feed passage (14) between the trough side walls (18), it is blocked from going anywhere but through piston port (16). It cannot leak or escape between the preloaded side rails (22) and trough side walls (18), and only serves to load the rails (22) harder against the walls (18). More specifically, the axially outward force provided by the bridging section (24) is directly applied between and against the two overlying side rail ends (28). Therefore, should contraction of the side rails (22) for any reason cause the underlying sloped side rails ends to wedge the overlying ends (28) away from the trough side walls (18), the tension of the bridging section (24) will tend to counteract, maintaining snug, continuous side rail (22) to side wall (18) contact. Total continuity of the blocking seal, radial, axial and circumferential, is maintained, with a seal that can be installed in one step.

A second embodiment of the blocking seal of the invention, indicated generally at (30), is designed to be installed in the same environment and to cooperate with the same trough side walls (18). It provides the same basic features and advantages, and may be described more briefly. Blocking seal (30) also has two annular side rails (32), which are the same size as the side rails (22). They are also each locally severed to produce underlying and overlying sloped ends (34) and (36). These overlap in the same basic relation as in seal (20). However, the overlying sloped ends (36) are directly axially opposed, not diagonally opposed. The side rails (32) are integrated by a bridging section which is significantly different in shape, being comprised not of a single, short beam but of a series of interengaged, sinuous convolutions (38). The convolutions (38) form one complete loop that begins at one overlying sloped end (36) and ends at another. Each convolution (38) presses against an axially opposed convolution (38), keeping the side rails (32) at the same free state separation A. When installed, however, the axial preload they provide will be stronger and more evenly distributed around the entire circumference of the side rails (32). In addition, even more preload force against the overlying sloped ends (36) is provided, because the convolutions (38) begin and end near them. The extra axial preload would make seal (30) even more suitable for maintaining seal continuity in high pressure environments, but would not add appreciably to seal torque, since the convolutions (38) are also radially inset from the side rails (32) and will not rub on the piston drum (12). Furthermore, the convolutions (38), since they are not directly attached to the the side rails (32), would not significantly retard their radial expansion and contraction.

In conclusion, both seal embodiments provide improved sealing in the intended environment, along with simpler handling and installation. If radial contraction and expansion of the side rails were not needed, then they would not have to be severed to produce the overlapping ends. The bridging section would then provide an axial preload for the side rails, but would not need to prevent the end wedging action described. Other shapes could be provided for the bridging section that joins the side rails, so long as it did not block the radial path from passage (14) to port (16), provided the same free state axial spacing of the side rails, and was radially clear of the drum (12) when installed. Theoretically, the side walls (18) could be cut into the surface of either the inner member or the surrounding outer member that forms the interface, although, in the environment disclosed, the drum (12) would generally not be thick enough to have a trough machined into it. Therefore, it will be understood that it is not intended to limit the invention to just the embodiments disclosed.

The embodiments of the invention in which an exclusive property or privilege is claimed are defined as follows:

1. A seal means for transmitting pressurized fluid from a feed passage across an annular interface of predetermined radial width formed between the outer cylindrical surface of an inner member and the inner cylindrical surface of a generally coaxial outer member, comprising, a trough cut into the cylindrical surface of one of said coaxial members so as to overlie said feed passage and open into said interface, said trough having a pair of axially spaced annular side walls disposed generally square to said central axis, a one-piece blocking seal comprising a pair of annular side rails having a free state outer diameter substantially equal to the cylindrical surface of the other of said members and a radial thickness greater than the radial width of said interface, so as to be engageable simultaneously both with said side walls and with said other cylindrical surface, and, a resilient, discrete bridging section interconnecting said side rails so as to maintain said side rails axially spaced apart, in a free state, by just slightly more than said side walls, whereby said blocking seal may be installed as a single unit into said trough, with said side rails being preloaded against said walls by compression of said resilient bridging section, after which the introduction of pressurized fluid into said trough forces said side rails more strongly into said side walls, thereby maintaining the axial continuity of said seal.

2. A seal means for transmitting pressurized fluid from a feed passage across an annular interface of predetermined radial width formed between the outer cylindrical surface of an inner member and the inner cylindrical surface of a generally coaxial outer member, comprising, a trough cut into the cylindrical surface of one of said coaxial members so as to overlie said feed passage and open into said interface, said trough having a pair of axially spaced annular side walls disposed generally square to said central axis, a one-piece blocking seal comprising a pair of annular side rails having a free state outer diameter substantially equal to the cylindrical surface of the other of said members and a radial thickness greater than the radial width of said interface, so as to be engageable simultaneously both with said side walls and with said other cylindrical surface, each of said side rails being severed so as to produce a pair of sloped, overlapping, underlying and overlying side rail ends to accommodate radial expansion and contraction of said side rails, and, a resilient, discrete bridging section interconnecting said side rails so as to said maintain said side rails axially spaced apart, in a free state, by just slightly more than said side walls, whereby said blocking seal may be installed as a single unit into said trough, with said side rails being preloaded against said walls by compression of said resilient bridging section, after which the introduction of pressurized fluid into said trough forces said side rails more strongly into said side walls, said bridging section also pressing out on said overlying ends and preventing them from being pried away from said side walls by said underlying ends, thereby maintaining the axial continuity of said seal.

* * * * *